United States Patent
Leske et al.

(10) Patent No.: US 9,380,267 B2
(45) Date of Patent: Jun. 28, 2016

(54) BANDWIDTH MODULATION SYSTEM AND METHOD

(71) Applicant: Google Inc., Mountain View, CA (US)

(72) Inventors: Matthew J. Leske, Stockholm (SE); Serge Lachappelle, Vallentuna (SE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/701,291

(22) Filed: Apr. 30, 2015

(65) Prior Publication Data

US 2015/0237305 A1    Aug. 20, 2015

Related U.S. Application Data

(63) Continuation of application No. 13/858,401, filed on Apr. 8, 2013, now Pat. No. 9,035,992.

(51) Int. Cl.
*H04N 7/15* (2006.01)

(52) U.S. Cl.
CPC ...................... *H04N 7/15* (2013.01)

(58) Field of Classification Search
CPC ....................................... H04N 7/15
USPC .......... 348/14.01, 14.04, 14.05, 14.08, 14.09; 370/468; 379/88.13; 700/94; 709/204, 709/227, 231, 235
See application file for complete search history.

(56) References Cited

U.S. PATENT DOCUMENTS

| | | | |
|---|---|---|---|
| 5,389,965 A * | 2/1995 | Kuzma | H04N 7/148 348/14.05 |
| 5,392,223 A | 2/1995 | Caci | |
| 5,546,324 A | 8/1996 | Palmer et al. | |
| 5,729,535 A | 3/1998 | Rostoker et al. | |
| 6,014,694 A | 1/2000 | Aharoni et al. | |
| 6,201,562 B1 * | 3/2001 | Lor | H04N 7/147 348/14.01 |
| 6,373,855 B1 * | 4/2002 | Downing | H04N 21/2368 370/468 |
| 6,480,541 B1 | 11/2002 | Girod et al. | |
| 6,665,002 B2 | 12/2003 | Liu | |
| 6,671,356 B2 * | 12/2003 | Lewis | H04L 12/58 348/E7.081 |
| 6,941,181 B1 * | 9/2005 | Mathurin | H04N 5/765 700/94 |
| 7,007,098 B1 | 2/2006 | Smyth et al. | |
| 7,058,721 B1 | 6/2006 | Ellison et al. | |
| 7,068,612 B2 | 6/2006 | Berkcan et al. | |
| 7,512,698 B1 | 3/2009 | Pawson | |
| 7,778,326 B1 | 8/2010 | Chen et al. | |
| 7,805,519 B2 * | 9/2010 | Ryu | G06T 3/4092 709/204 |
| 7,974,200 B2 | 7/2011 | Walker et al. | |
| 7,979,550 B2 | 7/2011 | Xiao et al. | |
| 7,984,174 B2 | 7/2011 | Rideout | |
| 8,171,157 B2 * | 5/2012 | Khan | H04L 47/2416 709/235 |
| 8,438,226 B2 * | 5/2013 | Kilmer | H04L 12/1822 348/14.08 |
| 8,531,500 B2 | 9/2013 | Sawada | |
| 8,558,863 B2 * | 10/2013 | Naidu | H04N 7/147 348/14.01 |
| 8,665,904 B2 * | 3/2014 | Bokish | H04L 29/06027 370/468 |
| 8,780,978 B2 | 7/2014 | Polisetty et al. | |
| 8,908,005 B1 * | 12/2014 | Leske | H04N 7/152 348/14.09 |
| 8,914,532 B2 | 12/2014 | Yamada et al. | |

(Continued)

*Primary Examiner* — Gerald Gauthier

(57) ABSTRACT

A method and computing system for monitoring an AV synchronous communication session of a user. The AV synchronous communication session includes an audio channel and a video channel. A performance characteristic is determined for the audio channel. The performance characteristic is compared to a defined audio performance threshold. If the performance characteristic does not meet the defined audio performance threshold, the video channel is adjusted to reduce the bandwidth requirements of the video channel.

20 Claims, 4 Drawing Sheets

(56) References Cited

U.S. PATENT DOCUMENTS

| | | | | |
|---|---|---|---|---|
| 8,976,223 B1 * | 3/2015 | Leske | H04N 7/15 345/473 |
| 9,001,178 B1 * | 4/2015 | Leske | H04N 7/155 348/14.08 |
| 9,035,992 B1 * | 5/2015 | Leske | H04N 7/15 348/14.04 |
| 9,185,442 B2 * | 11/2015 | Mamidwar | H04L 41/0816 |
| 9,210,378 B2 * | 12/2015 | Leske | H04N 7/15 |
| 2004/0119814 A1 | 6/2004 | Clisham et al. | |
| 2013/0290557 A1 * | 10/2013 | Baratz | H04L 65/60 709/231 |
| 2014/0009563 A1 * | 1/2014 | Leske | H04N 7/141 348/14.08 |
| 2015/0215580 A1 * | 7/2015 | Leske | H04N 7/15 348/14.08 |
| 2015/0215582 A1 * | 7/2015 | Leske | H04N 7/155 348/14.09 |
| 2015/0237305 A1 * | 8/2015 | Leske | H04N 7/15 348/14.04 |

* cited by examiner

BANDWIDTH MODULATION SYSTEM AND METHOD

CROSS-REFERENCE TO RELATED APPLICATIONS

This application is a continuation of U.S. application Ser. No. 13/858,401 filed Apr. 8, 2013, the disclosure of which is expressly incorporated herein by reference in its entirety.

TECHNICAL FIELD

This disclosure relates to bandwidth modulation and, more particularly, to bandwidth modulation within video conferencing systems.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

One such use of the Internet is to allow people to videoconference with each other. As videoconferencing adds a video component to a communication session, such communication sessions tend to be more enjoyable for the participants. Unfortunately, the use of videoconferencing sometimes results in less than acceptable performance due to the higher bandwidth requirements of such systems.

SUMMARY OF DISCLOSURE

In one implementation, a computer-implemented method includes monitoring an AV synchronous communication session of a user. The AV synchronous communication session includes an audio channel and a video channel. A performance characteristic is determined for the audio channel. The performance characteristic is compared to a defined audio performance threshold. If the performance characteristic does not meet the defined audio performance threshold, the video channel is adjusted to reduce the bandwidth requirements of the video channel. Adjusting the video channel includes: transferring the audio channel to a public switched telephone network if a client electronic device operated by the user of the AV synchronous communication session includes public switched telephone network capabilities; and eliminating the video channel.

In another implementation, a computer-implemented method includes monitoring an AV synchronous communication session of a user. The AV synchronous communication session includes an audio channel and a video channel. A performance characteristic is determined for the audio channel. The performance characteristic is compared to a defined audio performance threshold. If the performance characteristic does not meet the defined audio performance threshold, the video channel is adjusted to reduce the bandwidth requirements of the video channel.

One or more of the following features may be included. The performance characteristic may be based upon one or more of: a packet loss statistic; a jitter statistic; and a latency statistic. Adjusting the video channel to reduce the bandwidth requirements of the video channel may include reducing the resolution of the video channel; reducing the frame rate of the video channel; eliminating the video channel; and/or transferring the audio channel to a public switched telephone network.

It may be determined if a client electronic device operated by the user of the AV synchronous communication session includes public switched telephone network capabilities prior to transferring the audio channel to a public switched telephone network. Transferring the audio channel to a public switched telephone network may include initiating contact with a client electronic device operated by the user of the AV synchronous communication session.

Transferring the audio channel to a public switched telephone network may include receiving contact from a client electronic device operated by the user of the AV synchronous communication session. Transferring the audio channel to a public switched telephone network may include routing the audio channel on the public switched telephone network in accordance within one or more routing criteria.

In another implementation, a computing system including a processor and memory is configured to perform operations including monitoring an AV synchronous communication session of a user. The AV synchronous communication session includes an audio channel and a video channel. A performance characteristic is determined for the audio channel. The performance characteristic is compared to a defined audio performance threshold. If the performance characteristic does not meet the defined audio performance threshold, the video channel is adjusted to reduce the bandwidth requirements of the video channel.

One or more of the following features may be included. The performance characteristic may be based upon one or more of: a packet loss statistic; a jitter statistic; and a latency statistic. Adjusting the video channel to reduce the bandwidth requirements of the video channel may include reducing the resolution of the video channel; reducing the frame rate of the video channel; eliminating the video channel; and/or transferring the audio channel to a public switched telephone network.

It may be determined if a client electronic device operated by the user of the AV synchronous communication session includes public switched telephone network capabilities prior to transferring the audio channel to a public switched telephone network. Transferring the audio channel to a public switched telephone network may include initiating contact with a client electronic device operated by the user of the AV synchronous communication session.

Transferring the audio channel to a public switched telephone network may include receiving contact from a client electronic device operated by the user of the AV synchronous communication session. Transferring the audio channel to a public switched telephone network may include routing the audio channel on the public switched telephone network in accordance within one or more routing criteria.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Introduction

Figure 1:
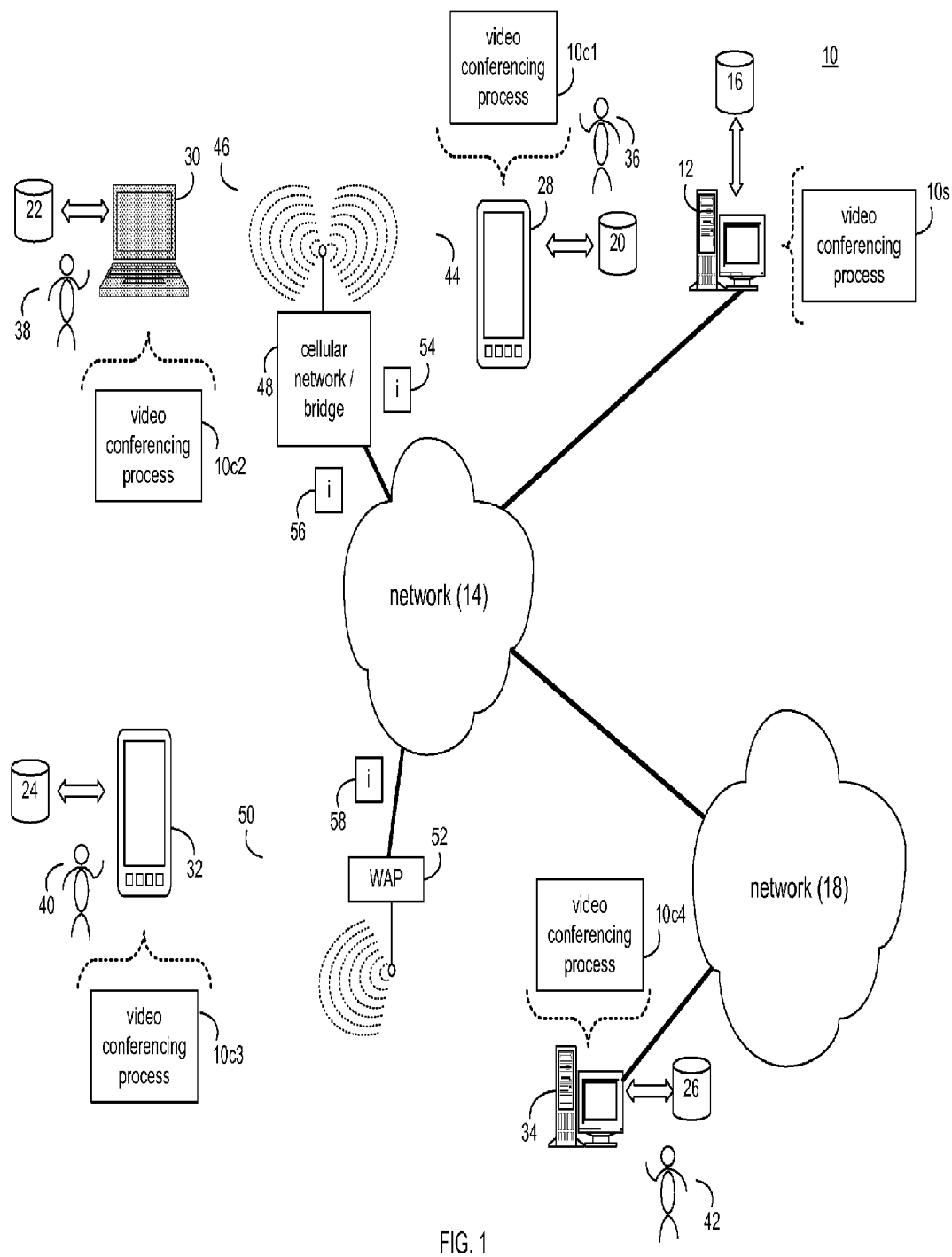
FIG. 1 is a diagrammatic view of a distributed computing network including a computing device that executes a video conferencing process according to an implementation of the present disclosure.
Figure 2:
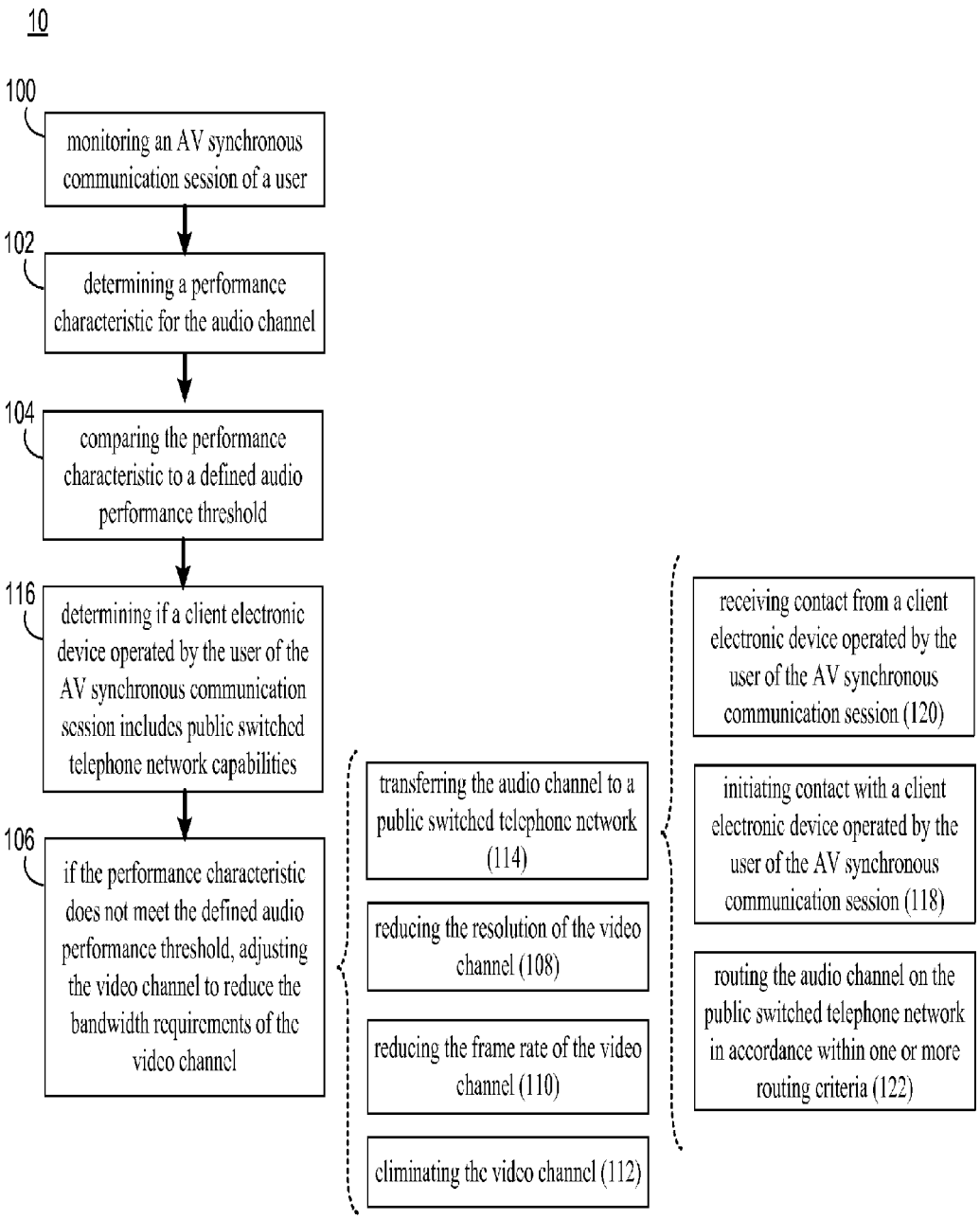
FIG. 2 is a flowchart of the video conferencing process of FIG. 1 according to an implementation of the present disclosure.

In FIGS. 1 & 2, there is shown video conferencing process 10. Video conferencing process 10 may be implemented as a server-side process, a client-side process, or a hybrid server-side/client-side process. For example, video conferencing process 10 may be implemented as a purely server-side process via video conferencing process 10s. Alternatively, video conferencing process 10 may be implemented as a purely client-side process via one or more of video conferencing process 10c1, video conferencing process 10c2, video conferencing process 10c3, and video conferencing process 10c4. Alternatively still, video conferencing process 10 may be implemented as a hybrid server-side/client-side process via video conferencing process 10s in combination with one or more of video conferencing process 10c1, video conferencing process 10c2, video conferencing process 10c3, and video conferencing process 10c4. Accordingly, video conferencing process 10 as used in this disclosure may include any combination of video conferencing process 10s, video conferencing process 10c1, video conferencing process 10c2, video conferencing process 10c3, and video conferencing process 10c4.

As will be discussed below in greater detail, video conferencing process 10 may monitor 100 an AV synchronous communication session of a user. As used in this disclosure, AV is intended to be an acronym for audio-visual, Accordingly, an AV synchronous communication session is intended to be an audio-visual communication session that includes both an audio component (e.g., a sound track) and a video component (e.g., a video track). Accordingly, the above-described AV synchronous communication session may include both an audio channel and a video channel. Video conferencing process 10 may determine 102 a performance characteristic for the audio channel and compare 104 the performance characteristic to a defined audio performance threshold. If the performance characteristic does not meet the defined audio performance threshold, video conferencing process 10 may adjust 106 the video channel to reduce the bandwidth requirements of the video channel.

Video conferencing process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of video conferencing process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of video conferencing processes 10c1, 10c2, 10c3, 10c4 may include but are not limited to a web browser, a web browser plug-in or applet, a game console user interface, a video conference user interface, or a specialized application (e.g., an application running on e.g., the Android™ platform or the iOS™ platform). The instruction sets and subroutines of video conferencing processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a television (not shown), a tablet computer (not shown) and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As is known in the art, users of social networks may be able to participate in group communication sessions. For example, Google+™ allows users of this social network to participate in "hangouts", which are multiuser videoconferences that allow for virtual gatherings of people so that they may chat about specific topics. While the above discussion concerns Google+™, this is for illustrative purposes only and is not intended to be a limitation of this disclosure. For example, video conferencing process 10 may be included within or utilized by any social network.

Video Conferencing Process

Figure 3:
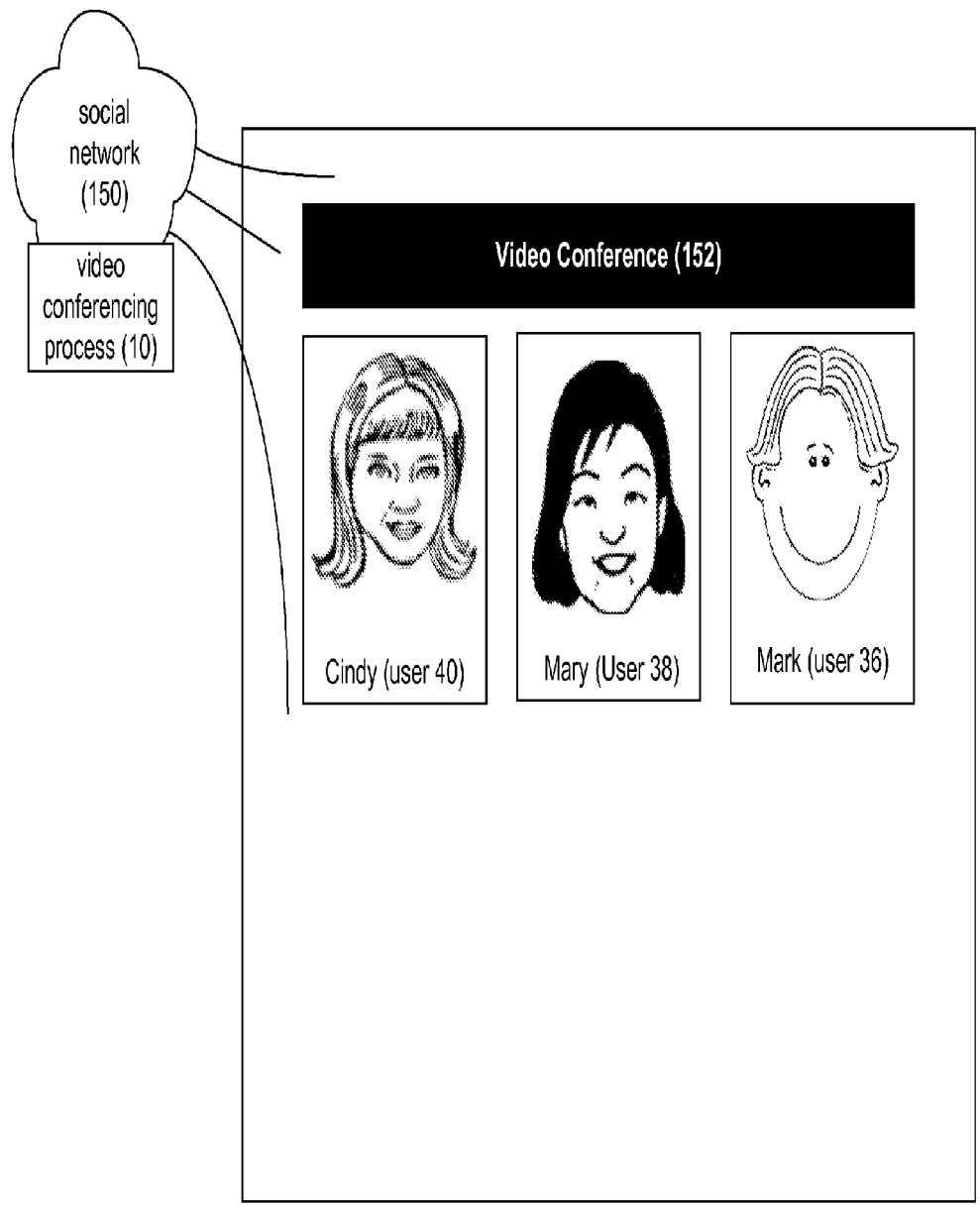
FIG. 3 is a diagrammatic view of a videoconference managed by the video conferencing process of FIG. 1 according to an implementation of the present disclosure.

Referring also to FIG. 3, assume for illustrative purposes that users 36, 38, 40, 42 are all members of social network 150. Further assume that users 36, 38, 40 wish to participate in videoconference 152. While the following discussion concerns videoconference 152 being executed within social network 150, this is for illustrative purposes only and is not intended to be a limitation of this disclosure, as other configurations are possible. For example, videoconference 152 may occur outside of social network 150 by way of e.g. a stand-alone communications application/product (not shown). For illustrative purposes, further assume that videoconference 152 will occur through computing device 12, where (in this example) users 36, 38, 40 will access videoconference 152 via client electronic devices 28, 30, 32 (respectively). Further, assume that videoconference 152 (as used in this disclosure) is intended to cover any form of video transmission, such as peer-to-peer video transmission, peer-to-many video transmission, or communal video transmission.

Accordingly and continuing with the above-stated example, assume that users 36, 38, 40 each indicate (e.g. via client electronic devices 28, 30, 32 respectively) an intention to participate in videoconference 152, thus generating indications 54, 56, 58 respectively. Video conferencing process 10 may receive an indication (e.g. indications 54, 56, 58) that users 36, 38, 40 (respectively) wish to participate in videoconference 152, thus defining a group of participants for videoconference 152.

Figure 4:
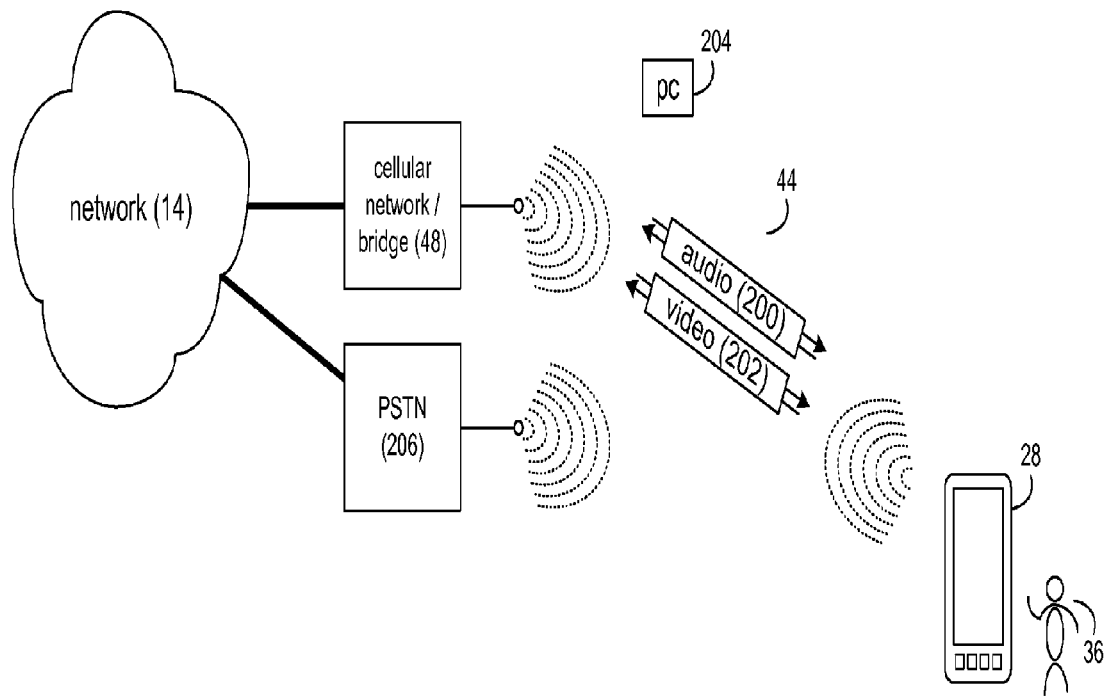
FIG. 4 is a detail view of a portion of the distributed computing network of FIG. 1 according to an implementation of the present disclosure.

Referring also to FIG. 4, while the following discussion will focus on a specific client electronic device (namely data-enabled, cellular telephone 28), this is for illustrative purposes only and is not intended to be a limitation of this disclosure, as other configurations are possible and are considered to be within the scope of this disclosure. For example, the following discussion may equally apply to any mobile data device that includes public switched telephone network capabilities (such as cellular telephones and tablets).

Continuing with the above-stated example, video conferencing process 10 may monitor 100 an AV synchronous communication session (e.g., video conference 152) of a user (e.g., user 36). As discussed above, when data-enabled, cellular telephone 28 communicates with network 14, wireless communication channel 44 may be established. With respect to data-enabled, cellular telephone 28, AV synchronous communication session (e.g., video conference 152) may occur via wireless communication channel 44.

AV synchronous communication session (e.g., video conference 152) may include an audio channel (e.g., audio channel 200) and a video channel (e.g., video channel 202). Further, since AV synchronous communication session (e.g., video conference 152) is bidirectional, each of audio channel 200 and video channel 202 may include two separate mono-directional channels, one from data-enabled, cellular telephone 28 to e.g., network 14 and one from e.g., network 14 to data-enabled, cellular telephone 28.

As is known in the art, when data is transmitted across a communication channel (e.g., wireless communication channel 44), the data may be broken up into smaller chunks of digitized data (e.g., data packets) and transmitted to a downstream destination (e.g., the final destination or an intermediate destination). Upon reaching the final destination, the individual data packets may be reassembled to generate the original data stream.

When monitoring 100 AV synchronous communication session (e.g., video conference 152), video conferencing process 10 may determine 102 a performance characteristic for audio channel 200. Specifically, video conferencing process 10 may analyze audio channel 200 since high levels of degradation of audio quality within an AV synchronous communication session (e.g., video conference 152) may result in the same being rendered unusable by many participants. The above-referenced performance characteristic may be based upon one or more of: a packet loss statistic; a jitter statistic; and a latency statistic. In the event that multiple individual statistics are used to determine the above-described performance statistic, the individual statistics (e.g., packet loss statistic; a jitter statistic; and a latency statistic) may be individually weighted in accordance with the requirements/design criteria of video conferencing process 10.

Packet Loss:

Packet loss may occur when one or more data packets travelling through a computer network (e.g., network 14) fail to reach their destination. Such a situation may result in playback in which portions of the data are missing. Packet loss may be expressed as the percentage of packets lost during transmission (e.g., 10% packet loss).

Jitter:

Jitter is the undesired temporal deviation from the true periodicity of a packetized periodic signal. For example, if a data packet is supposed to be received every millisecond but, instead, data packets are received in larger clumps every few milliseconds, such a situation may result in playback that lacks temporal smoothness. Jitter may be expressed in terms of packet delay variation (PDV).

Latency:

Latency is a measure of the delay experienced by data packets as they travel through a computer network (e.g., network 14). This delay may measure the amount of time for data packets to make a one way trip to a destination or may measure the amount of time required the packets to make a round trip. Such a situation may result the misalignment of audio and video tracks within a data stream. Latency may be expressed as the quantity of time that it takes for a packet to reach its destinations (based upon the assumption that data transmission should be instantaneous).

Once the above-referenced performance characteristic is determined 102, video conferencing process 10 may compare 104 the above-referenced performance characteristic to a defined audio performance threshold. For the following example, assume that the above-referenced performance characteristic is based upon a packet loss statistic and the defined audio performance threshold is 15% packet loss (which is deemed to be the point at which audio performance has degraded to the point that the AV synchronous communication session (e.g., video conference 152) is not providing the requisite level of performance to e.g., user 36.

Accordingly, in the event that the above-referenced performance characteristic is less than 15%, video conferencing process 10 may maintain the AV synchronous communication session (e.g., video conference 152) in its current configuration, as the performance of audio channel 200 is acceptable.

During the operation of the AV synchronous communication session (e.g., video conference 152), video conference process 10 may repeatedly determine 102 the above-referenced performance characteristic and compare 104 this performance characteristic to the defined audio performance threshold (which in this example is 15% packet loss). Assume that for some reason (e.g., network congestion) the above-referenced performance characteristic is determined 102 by video conference process 10 to be 16.1% packet loss. Accordingly, when comparing 104 this performance characteristic (i.e., 16.1% packet loss) to the above-referenced defined audio performance threshold (i.e., 15% packet loss), video conference process 10 will determine that the performance characteristic does not meet the defined audio performance threshold.

Since the performance characteristic (e.g., 16.1% packet loss) does not meet the defined audio performance threshold (e.g., 15%), video conferencing process 10 may adjust 106 video channel 202 to reduce the bandwidth requirements of video channel 202. For the following discussion, the video data transmitted through video channel 202 may include various types of "visual" data, examples of which may include but are not limited to: full motion video, still frame images, screen shots/captures, screen casting, screen sharing, shared whiteboards, shared chat windows, and shared visual collaboration data (such as that which may occur when playing a multiuser video game).

When adjusting 106 video channel 202 to reduce the bandwidth requirements of video channel 202, video conferencing process 10 may perform one or more processes/techniques. For example, video conferencing process 10 may reduce 108 the resolution of video channel 202; reduce 110 the frame rate of video channel 202; eliminate 112 video channel 202; and/or transfer 114 audio channel 200 to a public switched telephone network (PSTN 206).

Reducing Resolution:

The size of the video being transmitted through video channel 202 may be reduced in size (e.g., pixels) in order to reduce the bandwidth requirements of video channel 202. For example, if the video component of video conference 152 has a native resolution of 640×480 pixels, video conference process 10 may reduce 108 the resolution of video channel 202 down to e.g., 320×240, resulting in a 75% bandwidth reduction for video channel 202.

Reducing Frame Rate:

The number of frames included within each second of the video being transmitted through video channel 202 may be reduced in order to reduce the bandwidth requirements of video channel 202. For example, if the video component of video conference 152 has a native frame rate of 30 frames/second second, video conference process 10 may reduce 110 the frame rate of video channel 202 down to e.g., 15 frames/second, resulting in a 50% bandwidth reduction for video channel 202.

Eliminating Video:

In order to drastically reduce the bandwidth requirements of video channel 202, video conferencing process 10 may simply eliminate 112 video channel 202. Accordingly, video conferencing process 10 may simply transition video conference 152 to an audio-only conference for user 36.

Concerning the above-described processes/techniques performed by video conference process 10 to reduce the bandwidth requirements of video channel 202 (namely reducing 108 the resolution of video channel 202; reducing 110 the frame rate of video channel 202; and eliminating 112 video channel 202), video conferencing process 10 may be configured to sequentially implement these processes/techniques in response to e.g., worsening network conditions. For example, in the event that the performance characteristic (e.g., 16.1% packet loss) exceeds the defined audio performance threshold (e.g., 15%), video conferencing process 10 may first reduce 108 the resolution of video channel 202. In the event that the performance characteristic still (or subsequently) exceeds the defined audio performance threshold (e.g., 15%), video conferencing process 10 may reduce 110 the frame rate of video channel 202. In the event that the performance characteristic still (or subsequently) exceeds the defined audio performance threshold (e.g., 15%), video conferencing process 10 may eliminate 112 video channel 202 in its entirety, resulting in video conference 152 transitioning to an audio-only conference for user 36.

Further and as discussed above, video conferencing process 10 may transfer 114 audio channel 200 to a public switched telephone network (PSTN 206). For example, assume that the condition of network 14 has deteriorated to a point that the bandwidth available within wireless communication channel 44 has been reduced to a point such that the above-described performance characteristic still exceeds the defined audio performance threshold (e.g., 15%) even after reducing 108 the resolution of video channel 202; reducing 110 the frame rate of video channel 202; and eliminating 112 video channel 202. Accordingly, video conferencing process 10 may transfer 114 audio channel 200 to a public switched telephone network (PSTN) 206.

Prior to transferring 114 audio channel 200, video conferencing process 10 may determine 116 if the client electronic device (e.g., data-enabled, cellular telephone 28) operated by the user (e.g., user 36) of the AV synchronous communication session (e.g., video conference 152) includes public switched telephone network (PSTN) capabilities. For example, certain types of client electronic devices are not telephones and, therefore, would not have public switched telephone network (PSTN) capabilities. For example, a tablet computer, while capable of effectuating video conference 154 may be incapable of effectuating a telephone call on public telephone switched network (PSTN) 206.

However, in the event that e.g., data-enabled, cellular telephone 28 includes public switched telephone network (PSTN) capabilities, video conferencing process 10 may transfer 114 audio channel 200 to public switched telephone network (PSTN) 206 so that e.g., user 36 may participate in the audio portion of video conference 154 using a traditional voice call via public switched telephone network (PSTN) 206.

When transferring 114 audio channel 200 to public switched telephone network 206, video conferencing process 10 may initiate 118 contact with the client electronic device (e.g., data-enabled, cellular telephone 28) operated by user 36 of the AV synchronous communication session (e.g., video conference 154). For example, video conferencing process 10 may be configured to dial a telephone number known to be associated with data-enabled, cellular telephone 28, which may be answered by user 36, thus initiating 118 a PSTN connection between e.g., network 14 and data-enabled, cellular telephone 28.

Alternatively, when transferring 114 audio channel 200 to public switched telephone network 206, video conferencing process 10 may receive 120 contact from the client electronic device (e.g., data-enabled, cellular telephone 28) operated by user 36 of the AV synchronous communication session (e.g., video conference 154). For example, video conferencing process 10 may be configured to provide dial-in information to user 36, so that user 36 may dial a telephone number known to be associated with an access point coupled to/included within public switched telephone network (PSTN) 206, thus resulting in video conferencing process 10 receiving 120 contact from data-enabled, cellular telephone 28 and the establishment of a PSTN connection between e.g., network 14 and data-enabled, cellular telephone 28.

Further, when transferring audio channel 200 to public switched telephone network 206, video conferencing process 10 may rout audio channel 200 on public switched telephone network 206 in accordance within one or more routing criteria. For example, if video conference process 10 is a portion of an enterprise communications system for a corporation, video conferencing process 10 may rout audio channel 200 in a manner that allows for the utilization of e.g., a telephone infrastructure controlled by the corporation.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   monitoring an audio video communication session effectuated with a device, wherein the audio video communication session includes an audio channel and a video channel;
   determining that the device is capable of effectuating a telephone call on a public switched telephone network;
   determining a performance characteristic for the audio channel;
   comparing the performance characteristic to a defined audio performance threshold; and
   based on the comparison, transferring the audio channel of the audio video communication session to the public switched telephone network if the performance characteristic does not meet the defined audio performance threshold, wherein transferring the audio channel comprises initiating a voice call with a telephone number associated with the device via the public switched telephone network.

2. The computer-implemented method of claim 1, wherein determining that the device is capable comprises determining that the device is a cellular telephone.

3. The computer-implemented method of claim 1, further comprising adjusting the video channel in a manner that reduces bandwidth requirements.

4. The computer-implemented method of claim 3, wherein adjusting the video channel comprises at least one of: reducing frame rate of the video channel or reducing resolution of the video channel.

5. The computer-implemented method of claim 3, wherein adjusting the video channel comprises eliminating the video channel.

6. The computer implemented method of claim 1, wherein determining the performance characteristic comprises determining a packet loss metric.

7. The computer implemented method of claim 1, wherein determining the performance characteristic comprises determining at least one of a jitter metric or a latency metric.

8. A system comprising a network interface and a non-transitory machine-readable medium including instructions that when operated upon by a machine cause the machine to:
   monitor an audio video communication session effectuated with a device via the network interface, wherein the audio video communication session includes an audio channel and a video channel;
   determine that the device is capable of completing a telephone call on a public switched telephone network;
   determine a performance characteristic for the audio channel, wherein the performance characteristic comprises one or more of: packet loss, jitter, or latency;
   compare the performance characteristic to a defined audio performance threshold; and
   based on the comparison, transfer the audio channel of the audio video communication session to the public switched telephone network if the performance characteristic does not meet the defined audio performance threshold, wherein transferring the audio channel comprises initiating a voice call with a telephone number associated with the device via the public switched telephone network.

9. The system of claim 8, wherein the instructions further cause the machine to adjust the video channel in a manner that reduces video bandwidth requirements.

10. The system of claim 9, wherein the instructions to adjust the video channel further comprise instructions to reduce resolution of the video channel.

11. The system of claim 9, wherein the instructions to adjust the video channel further comprise instructions to reduce frame rate of the video channel.

12. The system of claim 9, wherein the instructions to adjust the video channel further comprise instructions to reduce bandwidth of the video channel to zero.

13. The system of claim 8, wherein the performance characteristic comprises jitter.

14. The system of claim 8, wherein the performance characteristic comprises packet loss.

15. A non-transitory computer-readable medium storing a computer program that is executable by at least one processor, the computer program including instructions that cause the at least one processor to perform operations comprising:
   monitor an audio video communication session provided by a device, wherein the audio video communication session includes an audio channel and a video channel;
   determine that the device is capable of making a telephone call on a public switched telephone network;
   determine a performance characteristic for the audio channel;
   compare the performance characteristic to a defined audio performance threshold; and
   based on the comparison, transfer the audio channel of the audio video communication session to the public switched telephone network if the performance characteristic does not meet the defined audio performance threshold, wherein transferring the audio channel comprises initiating a voice call with a telephone number associated with the device via the public switched telephone network.

16. The computer-readable medium of claim 15, wherein the instructions further cause the at least one processor to adjust the video channel so as to reduce bandwidth requirements of the video channel.

17. The computer-readable medium of claim 15, wherein the instructions further cause the at least one processor to adjust the video channel so as to reduce resolution of the video channel.

18. The computer-readable medium of claim 15, wherein the instructions further cause the at least one processor to adjust the video channel so as to reduce frame rate of the video channel.

19. The computer-readable medium of claim 15, wherein the instructions to transfer the audio channel comprise instructions to:
  receive contact from the device; and
  in response to the received contact, establish a public-switched telephone network connection with the device.

20. The computer-readable medium of claim 15, wherein the performance characteristic comprises at least one of: packet loss, jitter, or latency.

\* \* \* \* \*